(12) United States Patent
Kasai et al.

(10) Patent No.: US 7,820,775 B2
(45) Date of Patent: Oct. 26, 2010

(54) TETRAFLUOROETHYLENE POLYMER AND AQUEOUS DISPERSION THEREOF

(75) Inventors: Shunji Kasai, Settsu (JP); Makoto Ono, Settsu (JP); Taku Yamanaka, Settsu (JP); Yasuhiko Sawada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 58 days.

(21) Appl. No.: 12/296,865

(22) PCT Filed: Apr. 13, 2007

(86) PCT No.: PCT/JP2007/058189

§ 371 (c)(1),
(2), (4) Date: Oct. 10, 2008

(87) PCT Pub. No.: WO2007/119829

PCT Pub. Date: Oct. 25, 2007

(65) Prior Publication Data

US 2009/0281231 A1   Nov. 12, 2009

(30) Foreign Application Priority Data

Apr. 13, 2006 (JP) .............................. 2006-111156

(51) Int. Cl.
*C08F 14/18* (2006.01)
(52) U.S. Cl. ...................... 526/255; 524/546; 428/421; 428/422
(58) Field of Classification Search .................. 524/546; 526/255
See application file for complete search history.

(56) References Cited

U.S. PATENT DOCUMENTS

| 3,953,566 | A | * | 4/1976 | Gore | ........................... | 264/505 |
| 5,470,655 | A | * | 11/1995 | Hirai | ........................... | 428/364 |
| 6,177,533 | B1 | | 1/2001 | Woodward | | |
| 6,531,557 | B1 | | 3/2003 | Hosokawa et al. | | |
| 2002/0161149 | A1 | | 10/2002 | Kobayashi et al. | | |

FOREIGN PATENT DOCUMENTS

| CN | 1351088 A | 5/2002 |
| EP | 0 296 559 A2 | 12/1988 |
| EP | 1 016 679 A2 | 7/2000 |
| EP | 1 245 594 A1 | 10/2002 |
| JP | 10-053624 A | 2/1998 |
| JP | 2000-143727 A | 5/2000 |
| JP | 2002-201217 A | 7/2002 |
| JP | 2002-201218 A | 7/2002 |
| WO | 2005/061567 A1 | 7/2005 |

* cited by examiner

*Primary Examiner*—Mark Eashoo
*Assistant Examiner*—Nicole M Buie-Hatcher
(74) *Attorney, Agent, or Firm*—Sughrue Mion, PLLC

(57) ABSTRACT

The invention provides a TFE polymer capable of providing stretched materials excellent in membrane homogeneity. The present invention is related to a tetrafluoroethylene polymer having stretchability and non-melt-processability and having a standard specific gravity of 2.140 to 2.165, wherein, with regard to the heat-of-fusion curve obtained by subjecting the tetrafluoroethylene polymer in the form of an unbaked polymer to be measured having no history of being heated to a temperature of 300° C. or higher to differential scanning calorimetry at a programming rate of 2° C./minute, the ratio $S_2/S_1$ is not lower than 0.90.

7 Claims, 8 Drawing Sheets

TETRAFLUOROETHYLENE POLYMER AND AQUEOUS DISPERSION THEREOF

TECHNICAL FIELD

The present invention relates to a tetrafluoroethylene polymer, an aqueous dispersion thereof, a stretched material made of the tetrafluoroethylene polymer and an article comprising the stretched material.

BACKGROUND ART

Non-melt-processable tetrafluoroethylene [TFE] polymers have so far been used in various fields of application. For example, porous bodies obtained by extrusion molding of such a TFE polymer and the subsequent stretching are excellent in air permeability and are used as clothes, tents and industrial precision filters, among others.

In cases where a TFE polymer is used in the form of porous bodies, in particular industrial filters, a high level of membrane homogeneity is required, and the demand not only for high-level membrane homogeneity but also for lower pressure losses is growing. Therefore, works are under way to develop a TFE polymer capable of giving a high level of membrane homogeneity.

For the purpose of providing polytetrafluoroethylene [PTFE] species excellent in strength and capable of being suitably subjected to a stretching procedure following paste extrusion molding, PTFE species having a standard specific gravity of not higher than 2.160 and a tensile strength at break of 32.0 to 49.0 N, for instance, have been proposed (cf. e.g. Patent Document 1). However, there is no description about membrane homogeneity in biaxial stretching in which membrane homogeneity can hardly be attained.

Patent Document 1: Japanese Kokai Publication 2002-201217

DISCLOSURE OF INVENTION

Problems which the Invention is to Solve

In view of the above-discussed state of the art, it is an object of the present invention to provide a TFE polymer capable of giving stretched materials excellent in membrane homogeneity.

Means for Solving the Problems

The present invention provides a tetrafluoroethylene polymer having stretchability and non-melt-processability and having a standard specific gravity of 2.140 to 2.165, wherein, with regard to the heat-of-fusion curve obtained by subjecting the tetrafluoroethylene polymer in the form of an unbaked polymer to be measured having no history of being heated to a temperature of 300° C. or higher to differential scanning calorimetry at a programming rate of 2° C./minute, the ratio between the amount of heat, $S_2$ mJ/mg, absorbed within the temperature range of from the temperature $T_0°$ C., which is lower by 2.5° C. than the temperature $T_p°$ C. corresponding to the minimum point on the curve, provided that $340 \leq T_p \leq 345$, up to 350° C., and the amount of heat, $S_1$ mJ/mg, absorbed within the temperature range of from 320° C. up to the above-mentioned $T_0°$ C., namely the ratio, $S_2/S_1$, is not lower than 0.90.

The invention also provides an aqueous tetrafluoroethylene polymer dispersion comprising a tetrafluoroethylene polymer dispersed in an aqueous medium, the tetrafluoroethylene polymer being the above-mentioned tetrafluoroethylene polymer.

The invention also provides a stretched material obtained by using a tetrafluoroethylene polymer, the tetrafluoroethylene polymer being the above-mentioned tetrafluoroethylene polymer.

The invention also provides an article comprising a stretched material, the stretched material being the above-mentioned stretched material.

In the following, the invention is described in detail.

The tetrafluoroethylene [TFE] polymer according to the invention has stretchability and non-melt-processability.

The term "stretchability" as used herein means that an unbaked molded article obtained from the TFE polymer has stretch-processability.

The "unbaked molded article" means a molded article constituted of an unbaked polymer having no history of being heated to a temperature equal to or higher than the temperature $T_p°$ C. indicated by the minimum point on the heat-of-fusion curve to be mentioned later herein.

The term "non-melt-processability" as used herein means that the polymer has a high melt viscosity, so that it will not flow with ease in the molten state, hence can hardly be melt-processed. The TFE polymer according to the invention preferably has a melt viscosity at 380° C. of not lower than 1 ×10$^8$ Pa·s.

The TFE polymer according to the invention has a standard specific gravity [SSG] of not lower than 2.140 and not higher than 2.165.

From the stretchability viewpoint, a preferred upper limit to the above SSG is 2.160.

The above TFE polymer, which has an SSG within the above range, can give porous bodies high in break strength even when the stretch-processing is carried out at a high draw ratio.

The above SSG is regarded as an index of the average molecular weight and, generally, the lower the value thereof is, the higher the average molecular weight is.

The SSG so referred to herein is measured according to ASTM D 4895.

The TFE polymer according to the invention is generally polytetrafluoroethylene [PTFE]. The PTFE may be a tetrafluoroethylene [TFE] homopolymer or a modified PTFE species.

The "modified PTFE" so referred to herein is a TFE copolymer obtained by subjecting TFE and a very small proportion of a monomer other than TFE to polymerization without strongly influencing the properties of the corresponding TFE homopolymer.

The monomer other than TFE is, for example, a fluorinated monomer having an ethylenically unsaturated group.

As the ethylenically unsaturated group-containing fluorinated monomer, there may be mentioned, for example, hexafluoropropylene [HFP], perfluoro(alkyl vinyl ether) [PAVE] species, chlorotrifluoroethylene [CTFE], (perfluoromethyl)ethylene, (perfluorobutyl)ethylene, perfluorobutene-1, perfluorohexene-1 and perfluorononene-1.

As the PAVE species, there may be mentioned, for example, perfluoro(methyl vinyl ether) [PMVE], perfluoro(ethyl vinyl ether) [PEVE] and perfluoro(propyl vinyl ether) [PPVE].

The monomer other than TFE may comprise one single species or a combination of two or more species.

The total content of the repeating unit(s) derived from the monomer(s) other than TFE is preferably not higher than 1% by mass, more preferably not higher than 0.5% by mass, relative to the total amount of the repeating units derived from all the monomers from which the TFE polymer of the invention is formed.

The TFE polymer according to the invention is characterized in that, with regard to the heat-of-fusion curve obtained by subjecting the tetrafluoroethylene polymer in the form of an unbaked polymer to be measured having no history of being heated to a temperature of 300° C. or higher to differential scanning calorimetry at a programming rate of 2° C./minute, the ratio between the amount of heat, $S_2$ mJ/mg, absorbed within the temperature range of from the temperature $T_0°$ C., which is lower by 2.5° C. than the temperature $T_p°$ C. corresponding to the minimum point on the curve, provided that $340 \leq T_p \leq 345$, up to 350° C., and the amount of heat, $S_1$ mJ/mg, absorbed within the temperature range of from 320° C. up to the above-mentioned $T_0°$ C., namely the ratio, $S_2S_1$, is not lower than 0.90.

The above-mentioned "unbaked polymer to be measured" is the TFE polymer according to the invention which has no history of being heated to a temperature of 300° C. or above.

When the minimum point (peak top) on the above heat-of-fusion curve is lower than 340° C., the unbaked polymer to be measured tends to be inferior in membrane-forming properties, sometimes making stretch processing difficult.

On the above heat-of-fusion curve chart, the amount of heat, $S_2$ mJ/mg, absorbed within the range of the above-mentioned temperature $T_0°$ C. up to 350° C. corresponds to the area within the above temperature range out of the region formed between the heat-of-fusion curve and the baseline thereof. Similarly, the amount of heat, $S_1$ mJ/mg, absorbed within the range of from 320° C. to the temperature $T_0°$ C. corresponds to the area within the above temperature range out of the region formed between the heat-of-fusion curve and the baseline thereof.

By using the temperature $T_0°$ C. as the boundary temperature in determining the amount of heat absorbed $S_2$ and the amount of heat absorbed $S_1$, it becomes possible to reduce the influences of the differences on the heat-of-fusion curve, for example the differences in peak positions, as caused by use of different differential scanning calorimeter models and, at the same time, make the difference in ratio, $S_2/S_1$, more distinct.

The TFE polymer according to the invention gives a ratio, $S_2/S_1$, between the above-mentioned amount of heat absorbed $S_2$ mJ/mg and the above-mentioned amount of heat absorbed $S_1$ mJ/mg of not lower than 0.90.

When the above S2 is compared with the above $S_1$, the above $S_2$ can be said to represent the abundance of polymer molecules relatively high in molecular weight in the whole unbaked polymer to be measured, which is the target of measurement by differential scanning calorimetry, while the above $S_1$ can be said to represent the abundance of polymer molecules relatively low in molecular weight in the whole unbaked polymer to be measured.

The TFE polymer according to the invention, for which the above ratio, $S_2S_1$, is not lower than 0.90, can be said to be relatively abundant in molecules high in molecular weight and, for example, reduced in the abundance of molecules low in molecular weight, which reflect a low level of heat of fusion on the heat-of-fusion curve.

It is presumable that when relatively short polymer molecule chains coexist in the TFE polymer, the polymer molecule chains will readily get rid of their entangled condition when a shearing force acts on them on the occasion of stretching, for instance. However, the TFE polymer according to the invention is not abundant in such shorter polymer chain molecules but is abundant in longer polymer chain molecules and, further, is relatively narrow in molecular weight distribution and, therefore, can presumably maintain the entanglements among polymer molecules even under the action of a shearing force, hence can give stretched materials excellent in membrane homogeneity. The membrane homogeneity of the stretched materials obtained using the TFE polymer according to the invention is so excellent that it can be confirmed by observing, under a microscope, a stretched material obtained from the polymer for example by biaxial stretching fiber by fiber formed mainly as a result of polymer chain stretching.

In the prior art, development works have been made to increase the molecular weight for the purpose of improving the membrane homogeneity of PTFE-based stretched materials. However, the prior art products contain those low-molecular-weight molecules mentioned above and, upon application of a shearing force such as one in stretching, defects are readily caused among fibers, and the stretched materials obtained are still inferior in membrane homogeneity. In the case of biaxially stretched materials, in particular, this tendency is pronounced.

The above-mentioned ratio, $S_2/S_1$ is preferably not lower than 0.95, more preferably not lower than 1.0 and, within such range, it may be not higher than 1.1.

Since the TFE polymer according to the invention has a $S_2/S_1$ ratio within the above range, stretched materials obtained by stretch processing thereof are excellent in membrane homogeneity.

The TFE polymer according to the invention can be obtained by emulsion polymerization, for instance.

The emulsion polymerization can be carried out generally in an aqueous medium containing TFE, or TFE and another comonomer, together with a dispersant and a polymerization initiator.

In the above emulsion polymerization, the polymerization temperature is generally 20 to 100° C., preferably 50 to 85° C., and the polymerization pressure is generally 0.5 to 3.0 MPa.

Preferred as the dispersant in the above emulsion polymerization from the low chain transferability viewpoint is an anionic surfactant; more preferred is a perfluorocarbon type anionic surfactant.

As the above anionic surfactant, there may be mentioned, for example, $C_5F_{11}COONH_4$, $C_6F_{13}COONH_4$, $C_7F_{15}COONH_4$, $C_8F_{17}COONH_4$, $C_9F_{19}COONH_4$ and so forth.

One or a combination of two or more of such surfactants may be used as the dispersant.

The dispersant is preferably used in an amount corresponding to 250 to 5000 ppm of the mass of the aqueous medium used. Within this range, the stability of the aqueous dispersion is improved and TFE polymers high in break strength can be obtained.

The above dispersant is preferably supplemented during polymerization so that the stability of the aqueous dispersion may be further improved.

Preferred as the polymerization initiator in the above emulsion polymerization are a radical polymerization initiator and a redox system polymerization initiator, among others.

As for the amount of the polymerization initiator, amounts as small as possible are preferred from the viewpoint that the formation of low-molecular-weight TFE polymers impairing the homogeneity of stretched materials can be inhibited and TFE polymers low in SSG and high in $S_2/S_1$ ratio can be obtained. In excessively small amounts, however, the rate of polymerization tends to become excessively slow, while, in excessively large amounts, there is found a tendency toward the formation of TFE polymers low in $S_2/S_1$ ratio.

The above-mentioned radical polymerization initiator is, for example, a water-soluble organic peroxide. Such persulfate salts as ammonium persulfate and potassium persulfate are preferred, and ammonium persulfate is more preferred. These may be used singly or in combination.

The radical polymerization initiator is preferably used in an amount corresponding to 1 to 100 ppm, more preferably 1 to 10 ppm, of the mass of the aqueous medium used.

In cases where a radical polymerization initiator is used as the polymerization initiator, the addition of a radical scavenger during polymerization makes it possible to obtain TFE polymers low in SSG with ease.

As the radical scavenger, there may be mentioned, for example, unsubstituted phenol, polyhydric phenols, aromatic hydroxy compounds, aromatic amines and quinone compounds; among them, hydroquinone is preferred.

Preferably, the radical scavenger is added prior to arrival of the conversion at 50% by mass, more preferably 35% by mass, still more preferably 30% by mass, of the whole amount of TFE to be consumed in the polymerization reaction so that the formation of low-molecular-weight TFE polymers impairing the homogeneity of stretched materials may be inhibited and PTFE products low in SSG and high in $S_2/S_1$ ratio may be obtained.

Generally, the radical scavenger is used preferably in an amount corresponding to 0.1 to 10 ppm of the mass of the aqueous medium used.

As the redox system polymerization initiator, there may be mentioned combinations of a water-soluble oxidizing agent such as a persulfate salt or a bromated salt and a reducing agent such as a sulfite salt or a diimine.

When a redox system polymerization initiator is used as the polymerization initiator, TFE polymers low in SSG and high in break strength can be obtained.

The redox system polymerization initiator is used preferably in an amount corresponding to 1 to 100 ppm, more preferably 1 to 10 ppm, of the mass of the aqueous medium used.

For inhibiting the formation of low-molecular-weight TFE polymers impairing the homogeneity of stretched materials and obtaining PTFE products low in SSG and high in $S_2S_1$ ratio, it is preferred that the addition of either the oxidizing agent or the reducing agent, preferably the oxidizing agent, in the redox polymerization initiator system be discontinued during polymerization preferably at the time of point prior to arrival of the conversion at 50% by mass, more preferably 30% by mass, of the whole amount of TFE to be consumed in the polymerization reaction.

When such a redox system polymerization initiator as mentioned above is used, the polymerization reaction is preferably carried out at such a relatively low temperature as 50 to 70° C., more preferably 50 to 65° C., so that the formation of low-molecular-weight TFE polymers impairing the homogeneity of stretched materials may be inhibited and TFE products low in SSG and high in $S_2/S_1$ ratio may be obtained.

The above-mentioned emulsion polymerization is preferably carried out in the presence of one or more stabilizing agents.

Preferred as the stabilizing agent are paraffin waxes, fluorinated oils, fluorinated compounds and silicone oils, among others. Paraffin waxes are more preferred among them.

As for the paraffin waxes, those having a melting point of 40 to 65° C. are preferred, and those having melting point of 50 to 65° C. are more preferred.

The paraffin wax or waxes are preferably used in an amount corresponding to 0.1 to 12% by mass, more preferably 0.1 to 8% by mass, of the aqueous medium.

Generally, the above emulsion polymerization is carried out by mixing together the above-mentioned TFE, monomer(s) other than TFE, dispersant and polymerization initiator in an aqueous medium and gently stirring the mixture under stirring conditions selected so that fine TFE polymer particles formed may not coagulate.

Generally, the above emulsion polymerization can be carried out until arrival of the concentration of fine TFE polymer particles in the aqueous dispersion at 15 to 40% by mass. For inhibiting the formation of low-molecular-weight TFE polymers impairing the homogeneity of stretched materials and obtaining TFE products low in SSG and high in $S_2/S_1$ ratio, the polymerization is preferably carried out until arrival of the above-mentioned concentration at 30% by mass or above, more preferably 33% by mass or above.

By carrying out the above emulsion polymerization using such a radical polymerization initiator and such a radical scavenger as mentioned above and adding the radical scavenger before the consumption of a predetermined amount of TFE and continuing the emulsion polymerization until arrival of the concentration of fine TFE polymer particles in the aqueous dispersion at a predetermined specific level, it is possible to obtain TFE polymers capable of providing stretched materials excellent in membrane homogeneity without allowing the formation of low-molecular-weight polymers impairing the homogeneity of stretched membranes.

By carrying out the above-mentioned emulsion polymerization using a redox system initiator while maintaining the reaction temperature at a relatively low level and by discontinuing the addition of the oxidizing agent prior to arrival of the consumption of TFE at a predetermined specific level and continuing the emulsion polymerization until arrival of the concentration of fine TFE polymer particles in the aqueous dispersion at a predetermined specific level, it is possible to obtain TFE polymers capable of providing stretched materials excellent in membrane homogeneity without allowing the formation of low-molecular-weight polymers impairing the homogeneity of stretched membranes.

An aqueous TFE polymer dispersion comprising the TFE polymer according to the invention as dispersed in an aqueous medium also constitutes an aspect of the present invention.

The aqueous TFE polymer dispersion of the invention comprises the above-mentioned fine TFE polymer particles dispersed in the aqueous medium in the presence of the dispersant mentioned above.

The above aqueous TFE polymer dispersion is not particularly restricted provided that it contains the above-mentioned TFE polymer according to the invention. Thus, it may be an aqueous dispersion obtained by the above-mentioned emulsion polymerization without any post-treatment, namely the aqueous dispersion as obtained just after polymerization or the one obtained after such post-treatment as concentration or dilution following the emulsion polymerization.

The TFE polymer concentration and dispersant concentration in the aqueous TFE polymer dispersion can properly selected according to the intended subsequent use thereof.

The TFE polymer according to the invention may constitute a fine powder obtained by the emulsion polymerization.

The fine powder can be obtained by recovering the fine TFE polymer particles from the aqueous TFE polymer dispersion obtained by the above emulsion polymerization and drying after coagulation.

The coagulation is preferably carried out by stirring the aqueous dispersion at a high speed without adding any coagulant, although it may also be carried out adding a coagulant and stirring the aqueous dispersion.

Preferred as the coagulant are nitric acid, hydrochloric acid, ammonium carbonate and alcohols; among them, ammonium carbonate is more preferred.

The drying following the coagulation is preferably carried out at a temperature of 100 to 250° C., more preferably 130 to 200° C., although the drying conditions are not particularly restricted.

The fine powder of the TFE polymer of the invention generally has an average primary particle diameter of 0.1 to 0.5 μm, preferably 0.1 to 0.4 μm.

The term "primary particles" as used herein means TFE polymer particles before the above coagulation which have no history of being subjected to heat treatment at a temperature equal to or higher than the melting point of the TFE polymer after polymerization.

The term "average primary particle diameter" means the number average particle diameter of the above "primary particles".

The above-mentioned "primary average particle diameter" is the value indirectly determined in the following manner: with an aqueous TFE polymer dispersion having a solid matter concentration of 0.15% by mass, a working curve is constructed which shows the relation between the transmittance, per unit length, of light projected at the wavelength 550 nm and the average particle diameter determined from an electron photomicrograph, the transmittance is measured for the aqueous TFE polymer dispersion, which is the measurement target, is measured, and the average primary particle diameter is determined based on the working curve.

The above-mentioned fine powder preferably has an average particle diameter of 100 to 1000 μm, more preferably 400 to 600 μm.

The above average particle diameter is measured in accordance with ASTM D 1457.

The TFE polymer according to the invention in its fine powder form shows good extrudability and can be molded, for example, by paste extrusion at an extrusion pressure of 20 MPa or lower.

The extrusion pressure, so referred to herein, is measured on the occasion of paste extrusion through an orifice (diameter 2.5 cm, land length 1.1 cm, introduction angle 30°) under the conditions of reduction ratio 100, extrusion speed 51 cm/minute and temperature 25° C.

The TFE polymer according to the invention has stretchability and non-melt-processability and can give stretched materials excellent in membrane homogeneity and break strength, among others, after stretching.

A stretched material obtained by using the above-mentioned TFE polymer according to the invention also constitutes an aspect of the present invention.

The stretched material according to the invention may be one obtained by paste extrusion molding (to be described later herein), rolling and stretching or one obtained by baking following the stretching.

The stretched material may have any form or shape and thus may be in the form of a sheet, tube or electric wire, for instance.

The stretched material according to the invention, which is made of the above-mentioned TFE polymer according to the invention, is excellent in membrane homogeneity and break strength, among others, as mentioned above.

The stretched material is uniform in membrane appearance even when the total draw ratio on the area basis is 100, for instance.

For example, the break strength of the above stretched material can be 20 to 40 N, preferably 25 to 40 N.

The stretched material can show a stress relaxation time of 500 to 900 seconds, preferably 600 seconds or longer, more preferably 700 seconds or longer.

The break strength, so referred to herein, is the value obtained by measurement using a tensile testing machine (trademark: AGS-500D, product of Shimadzu Corporation) at room temperature and at a pulling rate of 300 mm/minute. The stress relaxation time mentioned above is defined as the time required for the above stretched material allowed to stand in a loaded condition in an oven at a temperature of 390° C. to break.

The stretched material according to the invention can be obtained, for example, by paste extrusion molding of the fine powder-form TFE polymer, followed by rolling and further followed by stretching.

The paste extrusion molding is generally carried out by mixing the above-mentioned fine powder with an extrusion aid (lubricant) and, after preliminary molding, extruding the resulting mixture.

The extrusion aid is not particularly restricted but may be any one known in the art; a petroleum hydrocarbon having a boiling point of 150° C. or higher, for example naphtha, is preferred, however.

The extrusion aid may be added at a level corresponding to 10 to 40% by mass of the total mass of the fine powder and extrusion aid.

The preliminary molding and extrusion can be carried out in the conventional manner, and the conditions can be properly selected.

The rolling can be carried out using rolls having a diameter of 300 to 700 mm. The sheet obtained by such rolling preferably has a thickness of 50 to 500 μm, more preferably 100 to 300 μm.

The stretching can be carried out at a temperature of 100 to 300° C.

The stretching speed and draw ratio can be properly selected according to the desired product, and the stretching can generally be carried out under the conditions of a speed of 10 to 1000%/second and a draw ratio of at least 3 (300%).

When the above stretching is followed by baking, the baking temperature is preferably 360 to 390° C.

An article comprising the above stretched material of the invention also constitutes an aspect of the present invention. The article according to the invention is not particularly restricted in form or shape provided that it comprises the above stretched material; thus, it may take any of various forms such as films, tubes, electric wires, etc.

The above article comprises the stretched material mentioned above and therefore is excellent in membrane homogeneity and break strength, among others.

As the above article, there may be mentioned, for example, clothes, tents and industrial precision filters, among others.

Effects of the Invention

The TFE polymer according to the invention, which has the constitution described hereinabove, can provide stretched materials excellent in membrane homogeneity and other characteristics. The stretched material obtained from the TFE polymer according to the invention is excellent in membrane homogeneity and other characteristics.

BEST MODES FOR CARRYING OUT THE INVENTION

The following examples illustrate the present invention in further detail. These examples are, however, by no means limitative of the scope of the invention.

The data given in the examples were obtained by the following measurement methods.

1. SSG

SSG measurements were carried out according to ASTM D 4895.

2. Melting Point and $S_2/S_1$ Ratio Measurements (1) Differential scanning calorimetry [DSC] was carried out using an RDC220 calorimeter (product of SII NanoTechnology) temperature-calibrated in advance using indium and lead as standard reference samples. About 3 mg of each tetrafluoroethylene [TFE] polymer in fine powder form was placed in an aluminum pan (crimped container) and heated under an air stream at 200 ml/minute within the temperature range of 270 to 370° C. at a programming rate of 2° C./minute. Indium, lead and tin were used as standard reference samples for heat quantity calibration, and the above aluminum pan was used as a measurement reference in an empty and sealed condition. (2) Using Muse standard analysis software (product of SII NanoTechnology), the heat-of-fusion curve obtained was normalized to a sample size of 3.0 mg, and the temperature range of 305 to 355° C. was specified as the range of analysis for determining the heat-of-fusion quantity. In this analytical range, the temperature corresponding to the minimum heat-of-fusion quantity was designated as $T_p$. Further, within this analytical range, the heat-of-fusion curve was divided vertically at (i) 320° C., (ii) $T_0$ (=$T_p$ −2.5)° C. and (iii) 350° C. and, further, (3) the quantity of heat absorbed within the range 320 to $T_o$° C., namely $S_1$ (mJ/mg), and the quantity of heat absorbed within the range $T_o$ to 350° C., namely $S_2$ (mJ/mg), were calculated, and the ratio between $S_1$ and $S_2$, namely $S_2/S_1$ ratio, was determined based on the respective calculated values.

3. Extrusion Pressure

A 100-g portion of each TFE polymer in fine powder form as allowed to stand at room temperature for at least 2 hours and 21.7 g of a lubricant (trademark: Isopar H (registered trademark), product of Exxon) were placed in a 900-cc glass bottle and, after blending by 3 minutes of stirring, the mixture was allowed to stand in a constant-temperature vessel at 25° C. for 2 hours and then subjected to paste extrusion through an orifice (diameter 2.5 mm, land length 1.1 cm, introduction angle 300) under the conditions of reduction ratio: 100, extrusion speed: 51 cm/minute and temperature: 25° C. to give a bead (extrusion-molded body). In this paste extrusion, the value obtained by dividing the load at extrusion load equilibrium by the area of the cylinder used was recorded as the extrusion pressure.

4. Break Strength

The bead (extrusion-molded body) prepared by the method described above under 3 was cut to an appropriate length, each end of the bead piece was fixed to give a clamp distance of 51 mm, the piece was heated to 300° C. in a circulating-air oven and then drawn to a total draw ratio of 24 by pulling the clamps apart at a drawing speed of 100%/second. The thus-prepared stretched material (a1) was pulled at room temperature at a rate of 300 mm/minute on a tensile tester (trademark: AGS-500D, product of Shimadzu) and the strength at break was measured.

5. Stress Relaxation Time

The bead (extrusion-molded body) prepared by the method described above under 3 was cut to an appropriate length, each end of the bead piece was fixed to give a clamp distance of 38 mm, the piece was heated to 300° C. in a circulating-air oven and then drawn to a total draw ratio of 24 (2400%) by pulling the clamps apart at a drawing speed of 1000%/second. The thus-prepared stretched material (a2) (total length 25 cm) was fixed in a taut condition by fixing means and allowed to stand in an oven at a temperature of 390° C., and the time, from this point of time, required for that material to break was determined as the stress relaxation time. The stretched material a2 on the fixing means was inserted into the oven through a (covered) slot at the side of the oven and therefore the temperature would not drop during disposition of the stretched material a2 within the oven, so that such a certain period of time as disclosed in U.S. Pat. No. 4,576,869 was not required for recovery.

6. Membrane Appearance Evaluation

The TFE polymer sheet prepared by the method described below under (1) was stretched 10 times lengthwise and 10 times widthwise, and the appearance of the thus-obtained stretched sheet was evaluated by macroscopic observation.

(1) TFE Polymer Sheet Preparation

A 3-kg portion of each TFE polymer in fine powder form and 960 g of an extrusion aid (trademark: Isopar M, product of Exxon) were placed in a 15-L plastic bottle and mixed up by 20 minutes of stirring at 100 rpm, and the mixture was allowed to stand in an oven at 40° C. for 12 hours for sufficient penetration of the extrusion aid.

Then, the extrusion aid-admixed TFE polymer in fine powder form was fed to a preform molding machine (100 ø mm) and, after arrival of the pressure at 3 MPa, retained for 10 minutes to give a preform. The preform was fed to an extruding machine (inside diameter 100 mm) with a die with an inside diameter of 11 mm ø mounted thereon in advance and set at 50° C. for extrusion. The extrudate was further rolled on 400 mm ø pressure rolls heated at 60° C. to give a 100-μm-thick sheet. The sheet obtained was heated to 180° C. to completely eliminate the extrusion aid.

(2) Method of Stretching

Using a stretching apparatus [4] equipped with a plurality of rolls [3] as shown in FIG. 1, the above TFE polymer sheet [1] was stretched 10 times lengthwise under the conditions of feed rate: 2.5 m/minute, final take-up speed: 25 m/minute and temperature: 250° C.

The 10-fold-stretched sheet [2] was cut into rectangles with a length of 10 cm and a width of 5 cm, and the rectangles were further stretched 10 times widthwise (unstretched sheet direction) at a temperature of 250° C. using a biaxial stretching apparatus (product of Imoto Machinery).

(3) Surface Observation Under a Scanning Electron Microscope [SEM]

Platinum-palladium was vapor-deposited on a sample specimen of the stretched sheet obtained by 10 times lengthwise and 10 times widthwise stretching by the method described above under (2), and the surface of the specimen was photographed at a magnification of 5000 using a Hitachi model S-4000 scanning electron microscope.

EXAMPLE 1

A 50-L polymerization vessel was charged with 30 kg of ultrapure water, 1.2 kg of paraffin wax and 45 g of ammonium perfluorooctanoate, deaerated by purging with nitrogen, and heated to a temperature of 70° C. After stabilization of the polymerization vessel inside temperature, tetrafluoroethylene [TFE] gas was introduced into the vessel to a pressure of 0.8 MPa.

While stirring the contents, an aqueous solution containing 0.15 g of ammonium persulfate was added and, then, TFE was continuously fed to maintain the polymerization vessel inside pressure at a constant level of 0.8 MPa and the polymerization vessel inside temperature was controlled at 70±2° C. At the time of arrival of the TFE consumption at 4.5 kg, an aqueous solution containing 90 mg of hydroquinone (product of Kishida Chemical) was added. At the time of arrival of the TFE consumption at 16.0 kg, the stirring and TFE feeding were discontinued, the TFE within the polymerization vessel was purged away and, then, the gaseous phase was replaced with nitrogen; an aqueous polytetrafluoroethylene [PTFE] dispersion (solid matter content 34.8% by mass) was thus obtained.

The above aqueous PTFE dispersion was allowed to coagulate without using any coagulant, and the PTFE in a wet condition was separated and dried at 160° C. for 18 hours to give a fine powder of PTFE.

The fine powder of PTFE obtained was measured and observed for SSG, endothermic peak ratio, extrusion pressure in paste extrusion, break strength, stress relaxation time and membrane appearance.

EXAMPLE 2

A 50-L polymerization vessel was charged with 30 kg of ultrapure water, 1.2 kg of paraffin wax and 45 g of ammonium perfluorooctanoate, deaerated by purging with nitrogen, and heated to a temperature of 70° C. After stabilization of the polymerization vessel inside temperature, TFE gas was introduced into the vessel to a pressure of 0.8 MPa.

While stirring the contents, an aqueous solution containing 0.10 g of ammonium persulfate was added and, then, TFE was continuously fed to maintain the polymerization vessel inside pressure at a constant level of 0.8 MPa and the polymerization vessel inside temperature was controlled at 70±2° C. At the time of arrival of the TFE consumption at 4.5 kg, an aqueous solution containing 90 mg of hydroquinone (product of Kishida Chemical) was added. At the time of arrival of the TFE consumption at 14.9 kg, the stirring and TFE feeding were discontinued, the TFE within the polymerization vessel was purged away and, then, the gaseous phase was replaced with nitrogen; an aqueous PTFE dispersion (solid matter content 33.2% by mass) was obtained.

The above aqueous PTFE dispersion was allowed to coagulate without using any coagulant, and the PTFE in a wet condition was separated and dried at 160° C. for 18 hours to give a fine powder of PTFE.

The thus-obtained fine powder of PTFE was subjected to various measurements in the same manner as in Example 1.

EXAMPLE 3

A 50-L polymerization vessel was charged with 30 kg of ultrapure water, 1.2 kg of paraffin wax and 45 g of ammonium perfluorooctanoate, deaerated by purging with nitrogen, and heated to a temperature of 70° C. After stabilization of the polymerization vessel inside temperature, TFE gas was introduced into the vessel to a pressure of 0.8 MPa.

While stirring the contents, an aqueous solution containing 0.15 g of ammonium persulfate was added and, then, TFE was continuously fed to maintain the polymerization vessel inside pressure at a constant level of 0.8 MPa and the polymerization vessel inside temperature was controlled at 70±2° C. At the time of arrival of the TFE consumption at 3.3 kg, an aqueous solution containing 90 mg of hydroquinone (product of Kishida Chemical) was added. At the time of arrival of the TFE consumption at 12.9 kg, the stirring and TFE feeding were discontinued, the TFE within the polymerization vessel was purged away and, then, the gaseous phase was replaced with nitrogen; an aqueous PTFE dispersion (solid matter content 30.5% by mass) was obtained.

The above aqueous PTFE dispersion was allowed to coagulate without using any coagulant, and the PTFE in a wet condition was separated and dried at 160° C. for 18 hours to give a fine powder of PTFE.

The fine powder of PTFE obtained was subjected to various measurements in the same manner as in Example 1.

EXAMPLE 4

A 50-L polymerization vessel was charged with 30 kg of ultrapure water, 1.5 kg of paraffin wax and 45 g of ammonium perfluorooctanoate, deaerated by purging with nitrogen, and heated to a temperature of 70° C. After stabilization of the polymerization vessel inside temperature, TFE gas was introduced into the vessel to a pressure of 2.7 MPa.

While stirring the contents, an aqueous solution containing 90 mg of ammonium persulfate was added and, then, TFE was continuously fed to maintain the polymerization vessel inside pressure at a constant level of 2.7 MPa and the polymerization vessel inside temperature was controlled at 70±2° C. At the time of arrival of the TFE consumption at 3.3 kg, an aqueous solution containing 60 mg of hydroquinone (product of Kishida Chemical) was added. At the time of arrival of the TFE consumption at 13.0 kg, the stirring and TFE feeding were discontinued, the TFE within the polymerization vessel was purged away and, then, the gaseous phase was replaced with nitrogen; an aqueous PTFE dispersion (solid matter content 30.2% by mass) was obtained.

The above aqueous PTFE dispersion was allowed to coagulate without using any coagulant, and the PTFE in a wet condition was separated and dried at 160° C. for 18 hours to give a fine powder of PTFE.

The fine powder PTFE obtained was subjected to various measurements in the same manner as in Example 1.

EXAMPLE 5

A 50-L polymerization vessel was charged with 30 kg of ultrapure water, 1.2 kg of paraffin wax and 45 g of ammonium perfluorooctanoate, together with 3 g of succinic acid and 210 mg of oxalic acid, deaerated by purging with nitrogen, and heated to a temperature of 55° C. After stabilization of the polymerization vessel inside temperature, TFE gas was introduced into the vessel to a pressure of 2.7 MPa.

While stirring the contents, a solution of 39 mg of potassium permanganate in ultrapure water was added continuously at a constant rate and, then, TFE was continuously fed to maintain the polymerization vessel inside pressure at a constant level of 2.7 MPa and the polymerization vessel inside temperature was controlled at 55±2° C. At the time of arrival of the TFE consumption at 5.3 kg, the addition of the whole amount of the solution of 39 mg of potassium permanganate in ultrapure water was completed. At the time of arrival of the TFE consumption at 13.7 kg, the stirring and TFE feeding were discontinued, the TFE within the polymerization vessel was purged away and, then, the gaseous phase was replaced with nitrogen; an aqueous PTFE dispersion (solid matter content 31.4% by mass) was obtained.

The above aqueous PTFE dispersion was allowed to coagulate without using any coagulant, and the PTFE in a wet condition was separated and dried at 160° C. for 18 hours to give a fine powder of PTFE.

The fine powder of PTFE obtained was subjected to various measurements in the same manner as in Example 1.

COMPARATIVE EXAMPLE 1

The polymerization procedure described in Japanese Patent Publication S58-39443, Example 4 was followed.

The aqueous PTFE dispersion obtained (solid matter content 23.0% by mass) was allowed to coagulate without using any coagulant, the PTFE in a wet condition was separated and dried at 160° C. for 18 hours to give a fine powder of PTFE.

The fine powder of PTFE obtained was subjected to various measurements in the same manner as in Example 1.

COMPARATIVE EXAMPLE 2

A 50-L polymerization vessel was charged with 30 kg of ultrapure water, 1.5 kg of paraffin wax and 45 g of ammonium perfluorooctanoate, together with 210 mg of oxalic acid, deaerated by purging with nitrogen, and heated to a temperature of 70° C. After stabilization of the polymerization vessel inside temperature, TFE gas was introduced into the vessel to a pressure of 2.7 MPa.

While stirring the contents, a solution of 39 mg of potassium permanganate in ultrapure water was added continuously at a constant rate, and TFE was continuously fed to maintain the polymerization vessel inside pressure at a constant level of 2.7 MPa and the polymerization vessel inside temperature was controlled at 70±2° C. At the time of arrival of the TFE consumption at 5.3 kg, the addition of the whole amount of the solution of 39 mg of potassium permanganate in ultrapure water was finished. At the time of arrival of the TFE consumption at 10.0 kg, the stirring and TFE feeding were discontinued, the TFE within the polymerization vessel was purged away and, then, the gaseous phase was replaced with nitrogen; an aqueous PTFE dispersion (solid matter content 25.0% by mass) was obtained.

The above aqueous PTFE dispersion was allowed to coagulate without using any coagulant, and the PTFE in a wet condition was separated and dried at 160° C. for 18 hours to give a fine powder of PTFE.

The fine powder of PTFE obtained was subjected to various measurements in the same manner as in Example 1.

COMPARATIVE EXAMPLE 3

A 50-L polymerization vessel was charged with 30 kg of ultrapure water, 1.5 kg of paraffin wax and 45 g of ammonium perfluorooctanoate, together with 210 mg of oxalic acid, deaerated by purging with nitrogen, and heated to a temperature of 70° C. After stabilization of the polymerization vessel inside temperature, TFE gas was introduced into the vessel to a pressure of 2.7 MPa.

While stirring the contents, a solution of 108 mg of potassium permanganate in ultrapure water was added continuously at a constant rate, and TFE was continuously fed to maintain the polymerization vessel inside pressure at a constant level of 2.7 MPa and the polymerization vessel inside temperature was controlled at 70±2° C. At the time of arrival of the TFE consumption at 5.3 kg, the addition of the whole amount of the solution of 108 mg of potassium permanganate in ultrapure water was finished. At the time of arrival of the TFE consumption at 14.9 kg, the stirring and TFE feeding were discontinued, the TFE within the polymerization vessel was purged away and, then, the gaseous phase was replaced with nitrogen; an aqueous PTFE dispersion (solid matter content 33.2% by mass) was obtained.

The above aqueous PTFE dispersion was allowed to coagulate without using any coagulant, and the PTFE in a wet condition was separated and dried at 160° C. for 18 hours to give a fine powder of PTFE.

The fine powder of PTFE obtained was subjected to various measurements in the same manner as in Example 1.

The results obtained in the examples and comparative examples are shown in Table 1.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| SSG | 2.151 | 2.153 | 2.158 | 2.157 | 2.160 | 2.173 | 2.175 | 2.155 |
| To (° C.) | 340.4 | 340.1 | 339.9 | 340.4 | 339.9 | 339.9 | 340.0 | 340.4 |
| Endothermic peak ratio S2/S1 | 1.09 | 1.01 | 0.95 | 1.05 | 0.91 | 0.65 | 0.55 | 0.73 |
| Extrusion pressure (MPa) | 18.8 | 17.5 | 16.2 | 17.0 | 19.4 | 15.5 | 17.0 | 17.5 |
| Break strength (N) | 31.0 | 28.5 | 24.5 | 29.0 | 27.0 | 22.0 | 17.2 | 34.0 |
| Stress relaxation time (sec) | 740 | 650 | 600 | 680 | 650 | 280 | 200 | 550 |
| Membrane appearance | ◎ | ◎ | ○ | ◎ | ○ | Δ | X | Δ |

$T_o = T_p - 2.5$ (° C.)
◎: Very uniform;
○: Uniform;
Δ: Membrane distinctly lacking in uniformity;
X: Break during stretching.

As the results shown in Table 1 clearly indicate, the extrusion pressure was low, the break strength and membrane appearance were good and the stress relaxation time was long in each of Examples 1 to 5, in which the SSG and endothermic peak ratio, $S_2/S_1$, were within the respective ranges specified herein. On the contrary, the membrane appearance was poor and the stress relaxation time was short in each of Comparative Examples 1 to 3, in which the SSG and ratio, $S_2/S_1$, were outside the respective ranges specified herein. Among them, the break strength was low in each of Comparative Examples 1 and 2.

INDUSTRIAL APPLICABILITY

The TFE polymer according to the invention, which has the constitution described hereinabove, can provide stretched materials excellent in membrane homogeneity and other characteristics and can be suitably used as a TFE polymer for stretch processing. The stretched material obtained from the TFE polymer according to the invention is excellent in membrane homogeneity and other characteristics.

EXPLANATION OF SYMBOLS

Figure 1:
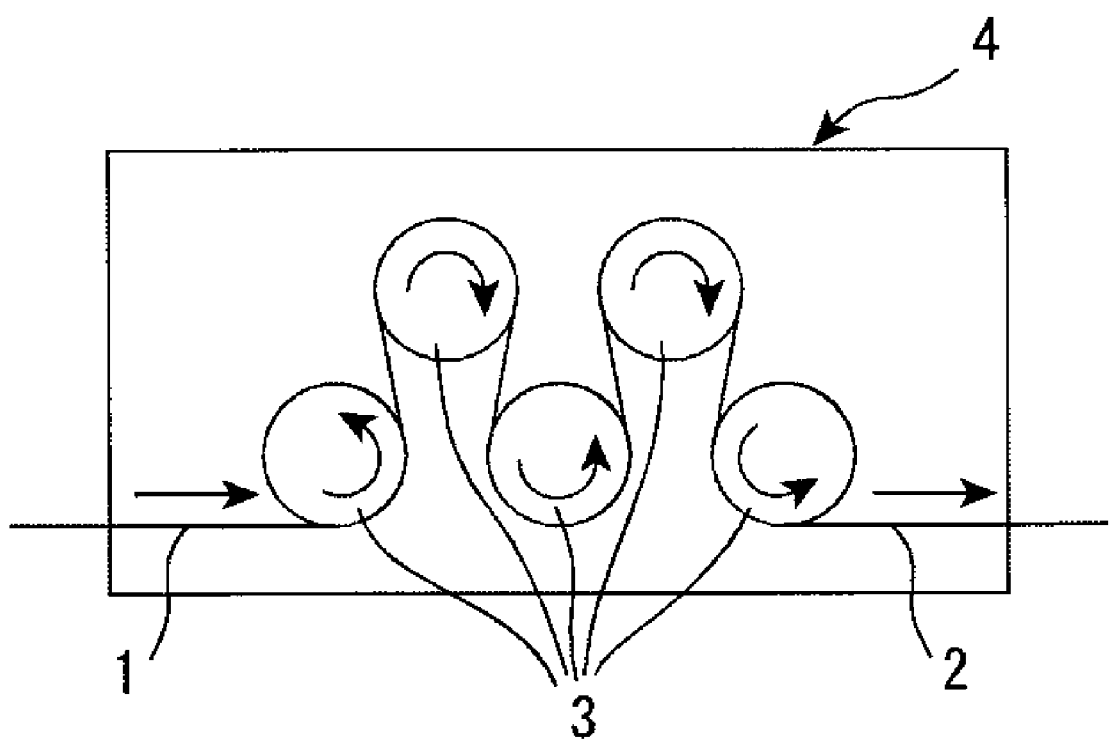
[FIG. 1] This is a schematic representation of a biaxial stretching apparatus to be used in membrane appearance evaluation.
Figure 2:
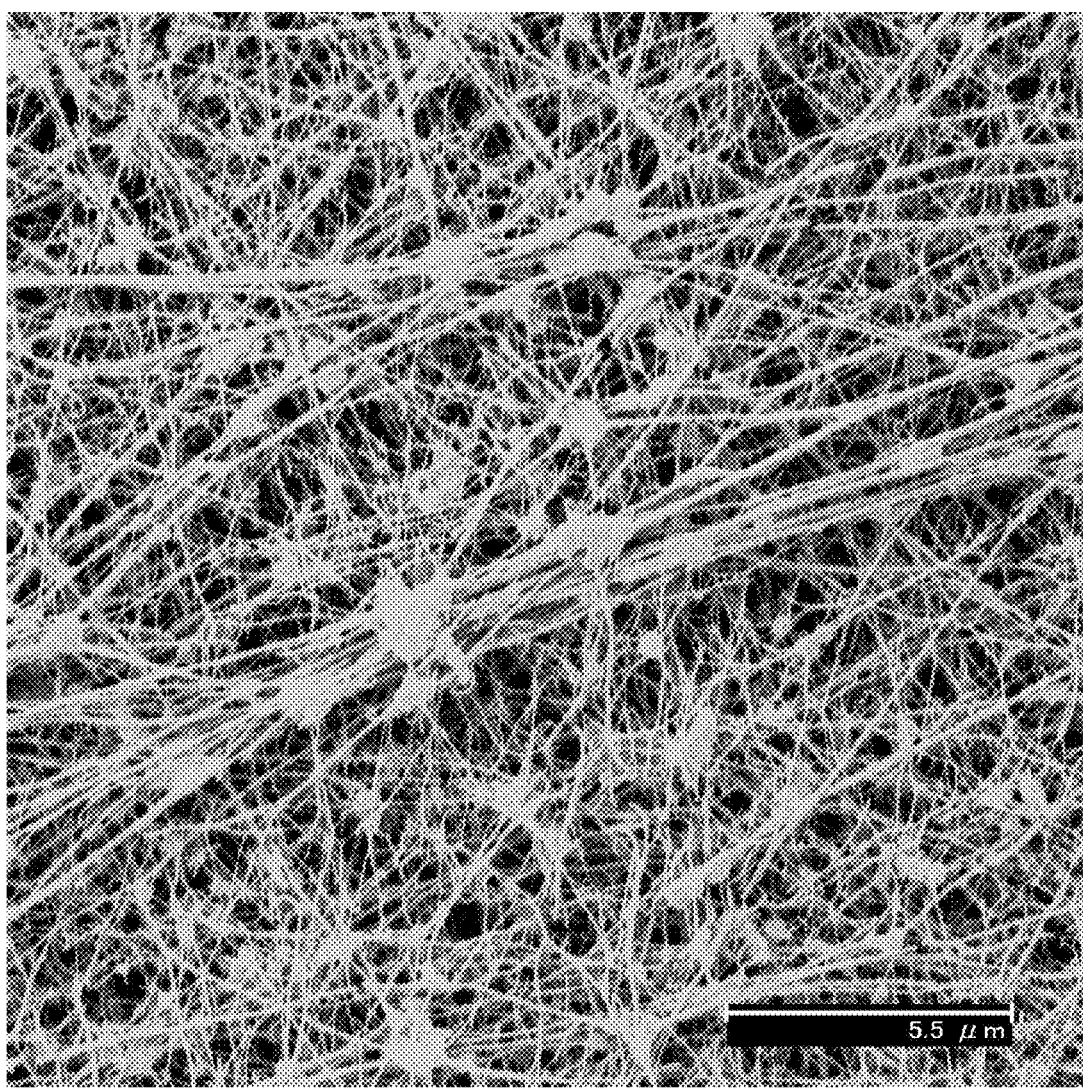
[FIG. 2] This is a SEM photograph of the stretched sheet obtained from the fine powder of PTFE of Example 1.
Figure 3:
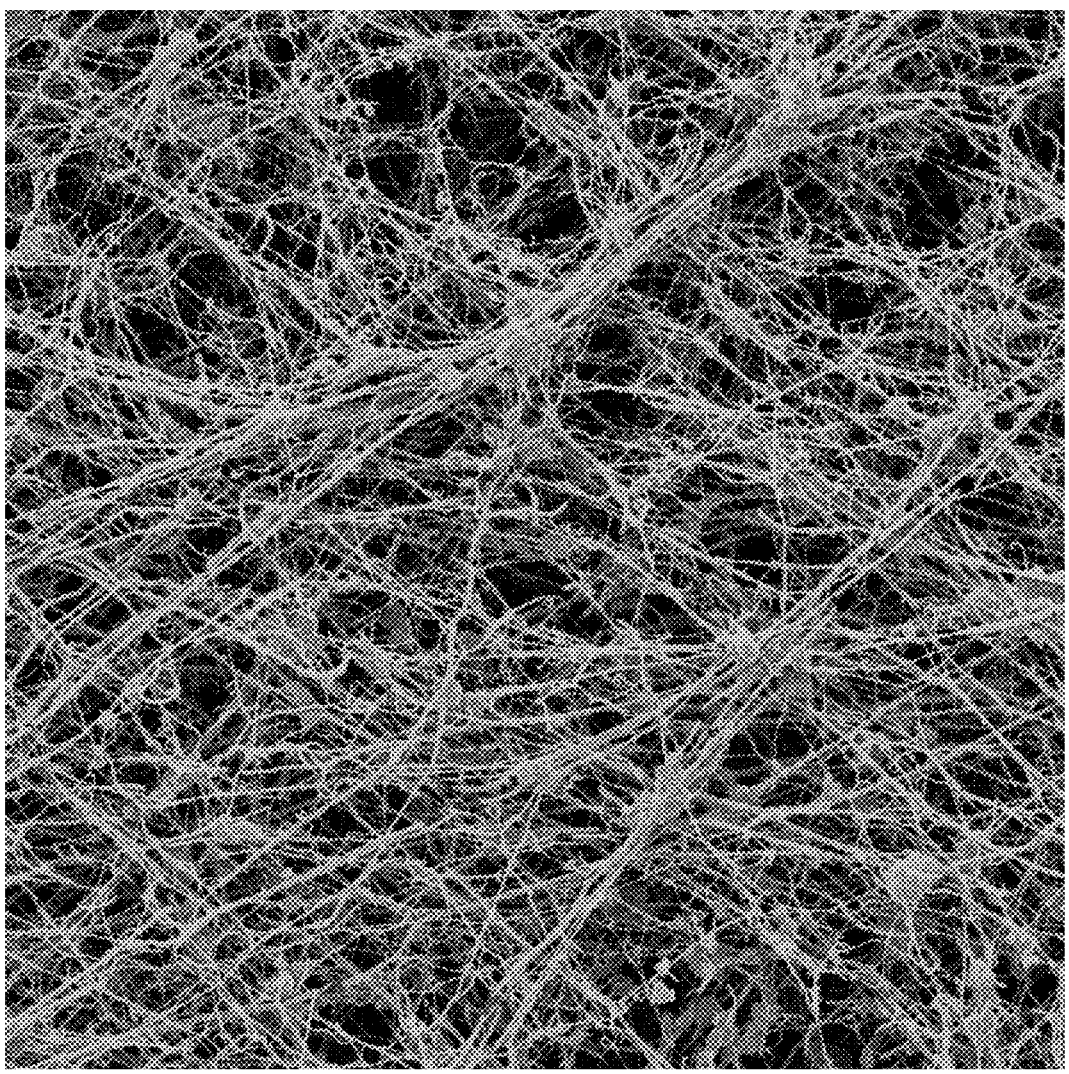
[FIG. 3] This is a SEM photograph of the stretched sheet obtained from the fine powder of PTFE of Example 2.
Figure 4:
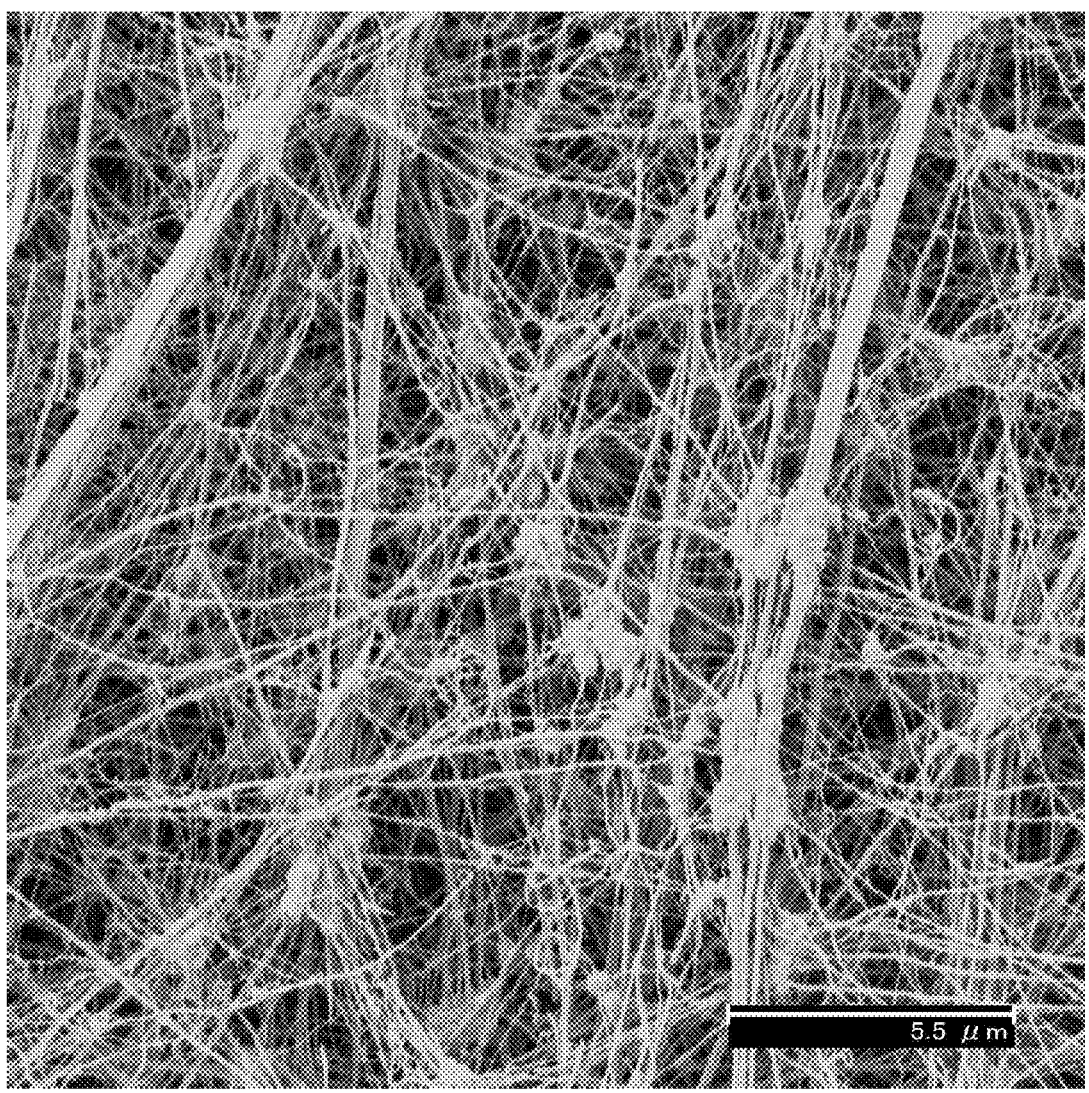
[FIG. 4] This is a SEM photograph of the stretched sheet obtained from the fine powder of PTFE of Example 3.
Figure 5:
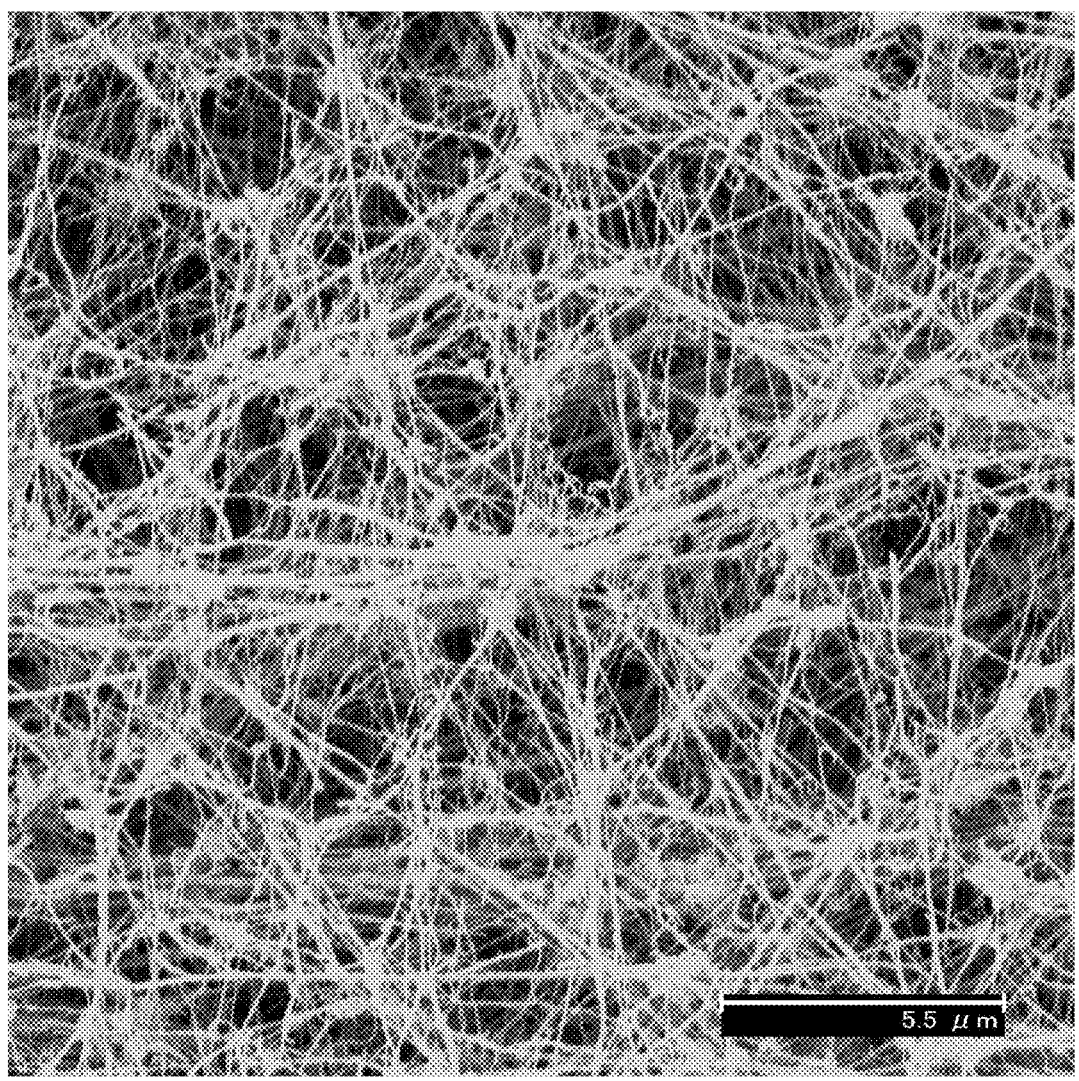
[FIG. 5] This is a SEM photograph of the stretched sheet obtained from the fine powder of PTFE of Example 4.
Figure 6:
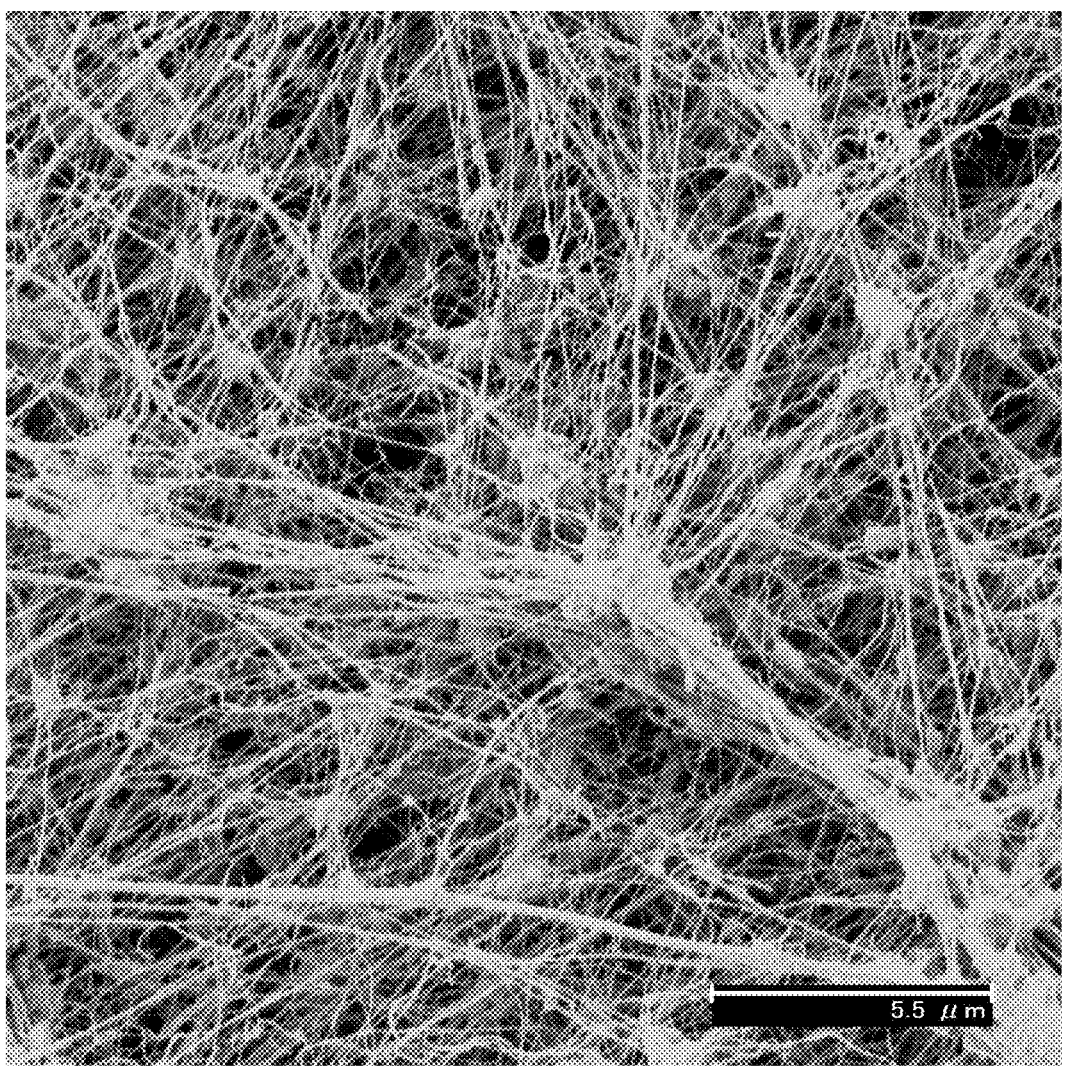
[FIG. 6] This is a SEM photograph of the stretched sheet obtained from the fine powder of PTFE of Example 5.
Figure 7:
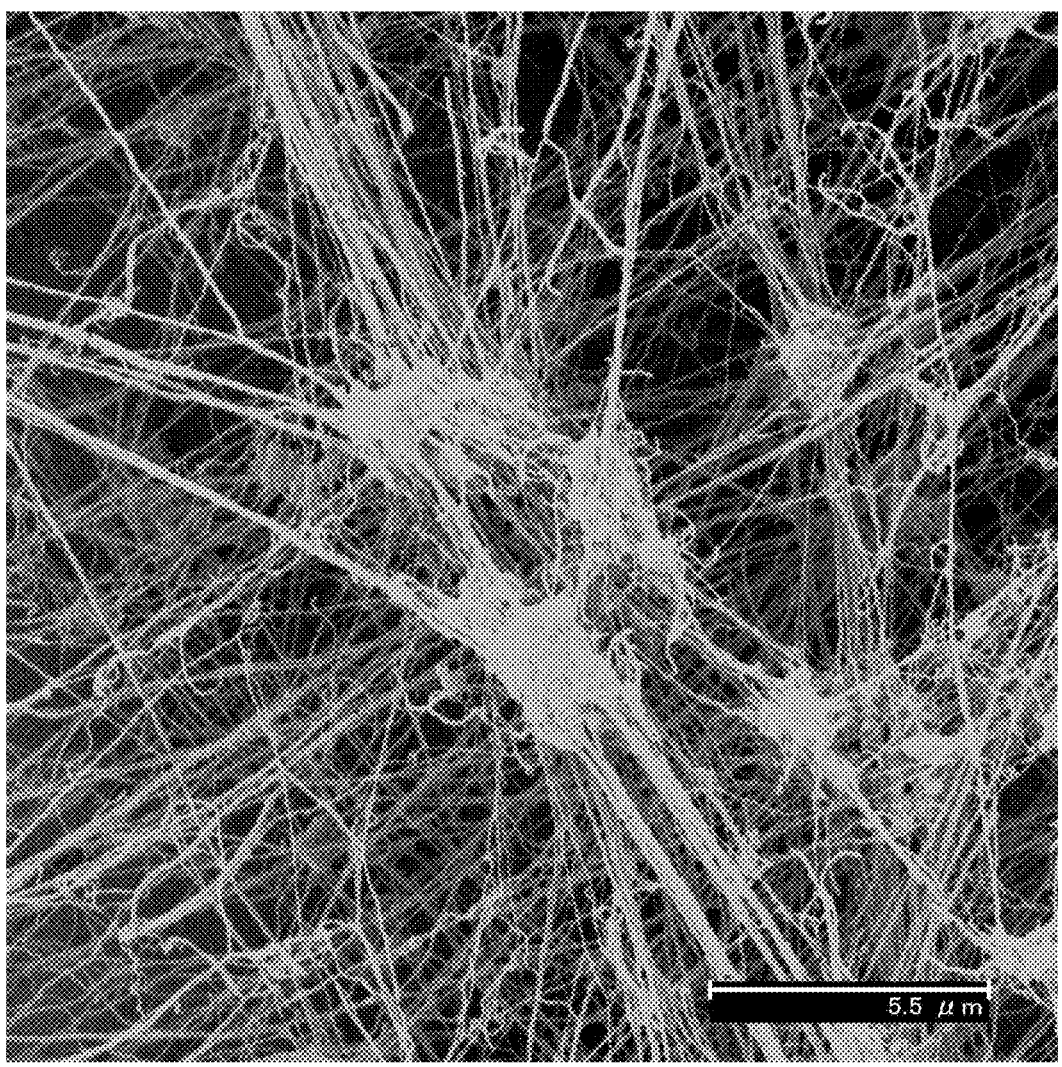
[FIG. 7] This is a SEM photograph of the stretched sheet obtained from the fine powder of PTFE of Comparative Example 1.
Figure 8:
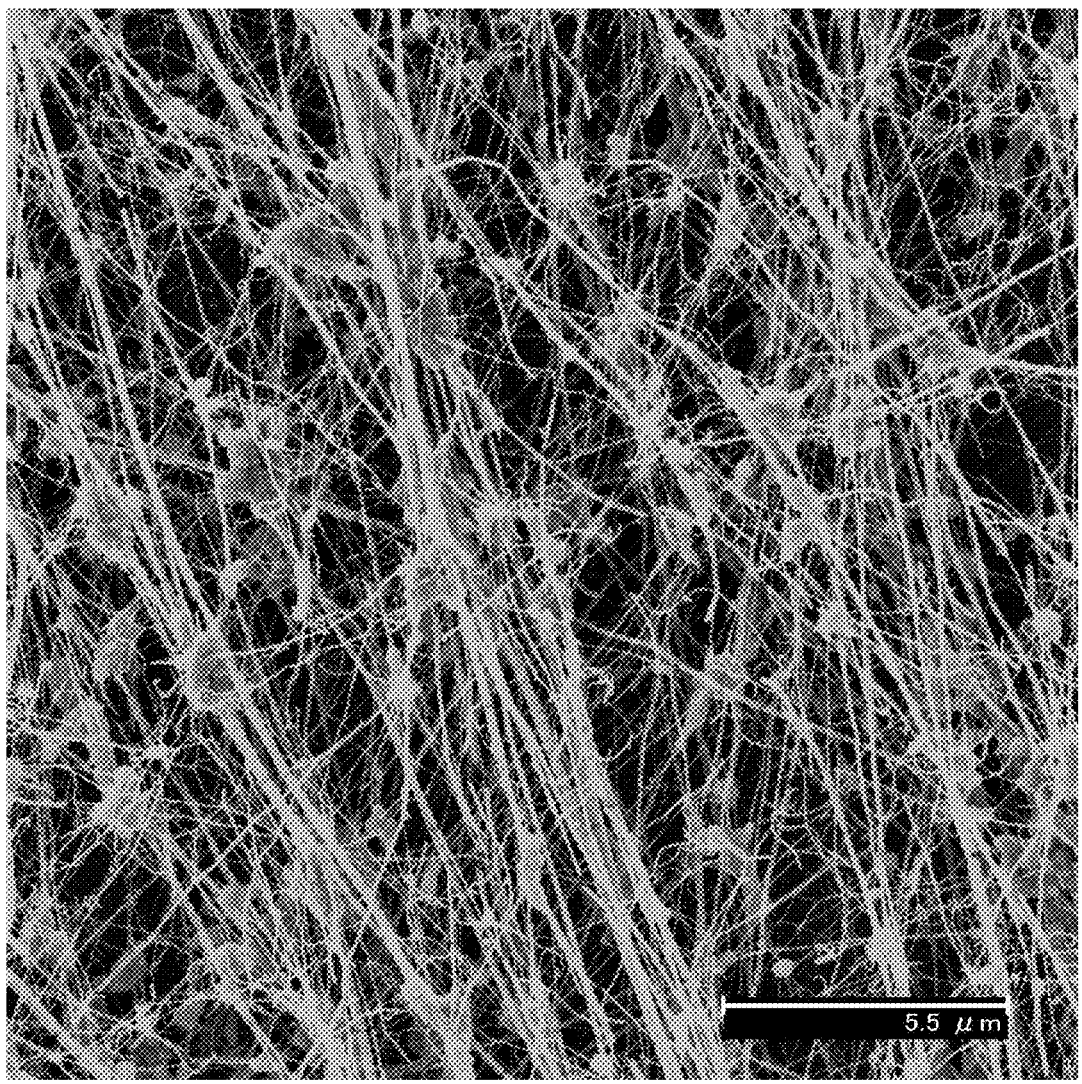
[FIG. 8] This is a SEM photograph of the stretched sheet obtained from the fine powder of PTFE of Comparative Example 3.

1. TFE polymer sheet
2. Stretched sheet
3. Roll
4. Stretching apparatus

The invention claimed is:

1. A tetrafluoroethylene polymer having stretchability and non-melt-processability and having a standard specific gravity of 2.140 to 2.165,
wherein, with regard to the heat-of-fusion curve obtained by subjecting the tetrafluoroethylene polymer in the form of an unbaked polymer to be measured having no history of being heated to a temperature of 300° C. or higher to differential scanning calorimetry at a programming rate of 2° C./minute,
the ratio between the amount of heat, $S_2$ mJ/mg, absorbed within the temperature range of from the temperature $T_0$° C., which is lower by 2.5° C. than the temperature $T_p$° C. corresponding to the minimum point on the curve, provided that $340 < T_p < 345$, up to 350° C., and the amount of heat, $S_1$ mJ/mg, absorbed within the temperature range of from 320° C. up to the above-mentioned $T_0$° C., namely the ratio, $S_2/S_1$, is not lower than 0.90.

2. The tetrafluoroethylene polymer according to claim 1, wherein the ratio, $S_2/S_1$, is not lower than 0.95.

3. The tetrafluoroethylene polymer according to claim 1, wherein the ratio, $S_2/S_1$, is not lower than 1.00.

4. The tetrafluoroethylene polymer according to claim 1, wherein the tetrafluoroethylene polymer constitutes a fine powder obtained by emulsion polymerization.

5. An aqueous tetrafluoroethylene polymer dispersion comprising a tetrafluoroethylene polymer dispersed in an aqueous medium,
said tetrafluoroethylene polymer being the tetrafluoroethylene polymer according to claim 1.

6. A stretched material obtained by using a tetrafluoroethylene polymer,
said tetrafluoroethylene polymer being the tetrafluoroethylene polymer according to claim 1.

7. An article comprising a stretched material,
said stretched material being the stretched material according to claim 6.

* * * * *